Figure 1:
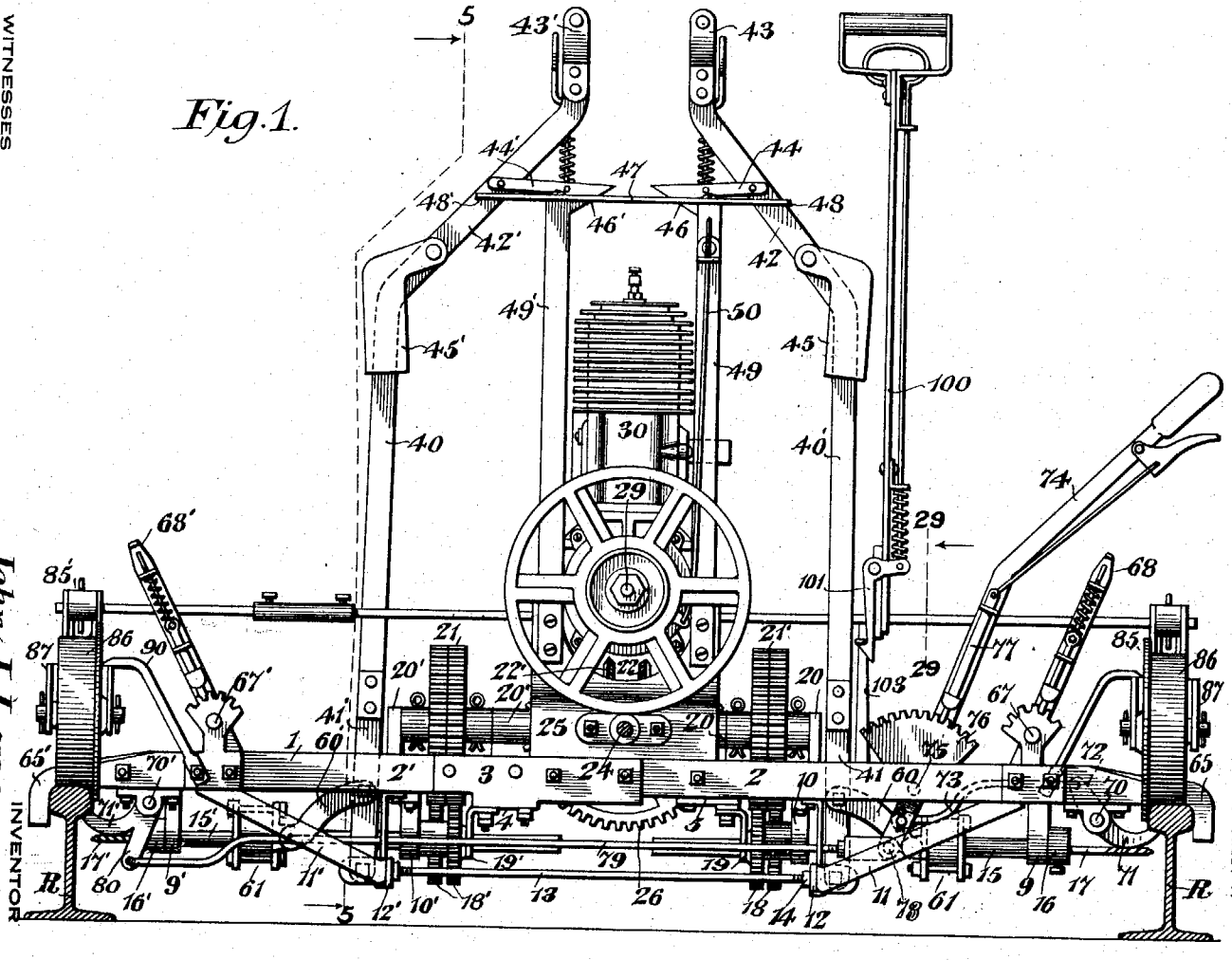

J. J. LONSWAY.

PORTABLE RAIL DRILL.

APPLICATION FILED JULY 24, 1916.

Reissued Sept. 26, 1916.

14,196.

8 SHEETS—SHEET 1.

WITNESSES

Jas. E. McCathran

F. T. Chapman

INVENTOR

John J. Lonsway,

BY

E. G. Siggers

ATTORNEY

THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 2.

WITNESSES

Jas. K. McCathran

F. T. Chapman.

John J. Lonsway,

INVENTOR

BY E. G. Siggers

ATTORNEY

THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 3.

WITNESSES

Jas. K. McCathran

A. T. Chapman

INVENTOR

John J. Lonsway,

BY

E. G. Siggers

ATTORNEY

THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 4.

WITNESSES

Jas. K. McCathran

F. T. Chapman

INVENTOR

John J. Lonsway,

BY

E. G. Siggers

ATTORNEY

THE NORRIS PETERS CO., PHOTO-LITHO., WASHINGTON, D. C.

J. J. LONSWAY.
PORTABLE RAIL DRILL.
APPLICATION FILED JULY 24, 1916.
Reissued Sept. 26, 1916.
14,196.
8 SHEETS—SHEET 5.
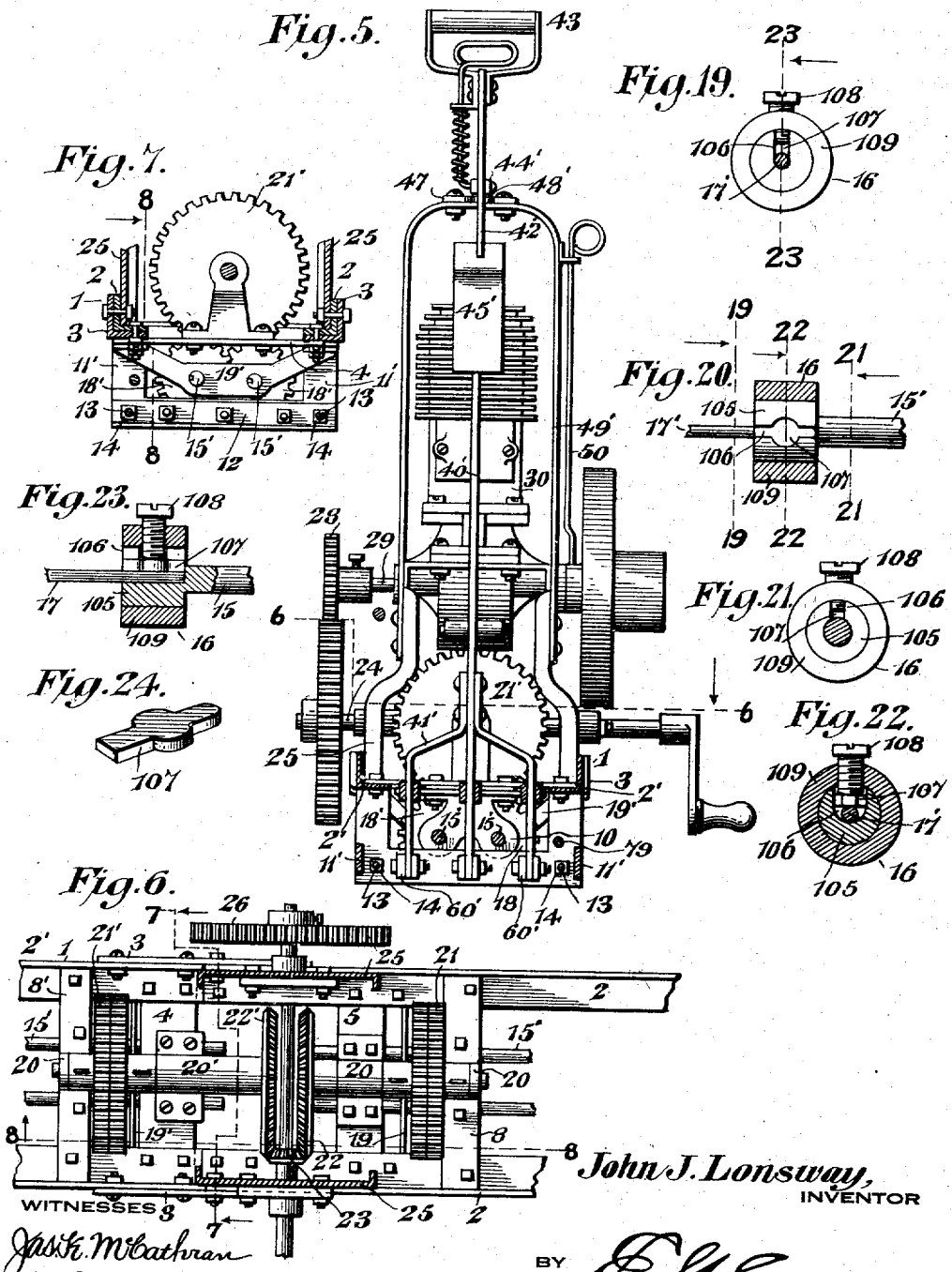
WITNESSES
Jas. K. McCathran
F. T. Chapman
John J. Lonsway,
INVENTOR
BY E. G. Siggers
ATTORNEY
THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 6.

John J. Lonsway,
INVENTOR

WITNESSES

Jas. K. McCathran

F. T. Chapman.

BY E. G. Siggers

ATTORNEY

THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 7.

WITNESSES

Jas. K. McCathran

F. T. Chapman.

INVENTOR

John J. Lonsway,

BY

E. G. Siggers

ATTORNEY

THE NORRIS PETERS CO., PHOTO-LITHO., WASHINGTON, D. C.

J. J. LONSWAY.

PORTABLE RAIL DRILL.

APPLICATION FILED JULY 24, 1916.

Reissued Sept. 26, 1916.

14,196.

8 SHEETS—SHEET 8.

WITNESSES

Jas. K. McCutchen

F. T. Chapman.

INVENTOR

John J. Lonsway,

BY

E. G. Siggers

ATTORNEY

THE NORRIS PETERS CO., PHOTO-LITHO., WASHINGTON, D. C.

UNITED STATES PATENT OFFICE.

JOHN J. LONSWAY, OF FOSTORIA, OHIO.

PORTABLE RAIL-DRILL.

14,196. Specification of Reissued Letters Patent. Reissued Sept. 26, 1916.

Original No. 1,145,906, dated July 13, 1915, Serial No. 865,178, filed October 5, 1914. Application for reissue filed July 24, 1916. Serial No. 111,095.

*To all whom it may concern:*

Be it known that I, JOHN J. LONSWAY, a citizen of the United States, residing at Fostoria, in the county of Seneca and State of Ohio, have invented new and useful Improvements in Portable Rail-Drills; and I do declare the following to be a full, clear, and exact description of the invention, such as will enable others skilled in the art to which it appertains to make and use the same.

My invention relates broadly to drilling machines and more particularly to improvements in devices of this character for use for the purpose of drilling the rails or tracks of railways.

The main object of the invention is to improve upon devices of this character to such an extent as to provide a comparatively simple structure possessing numerous advantageous features, among which, in addition to the capability of drilling both rails of the track, there is the capability of reduction as to effective length of the machine cross-wise of the track, so that a rail may be drilled by the machine when the clearance between the rails is lessened by the presence of a frog or for some other reason.

To the above end, a further object becomes to provide a main supporting frame formed in two sections, and to equip said sections with independent drilling and clamping units, whereby, in certain cases, one of the sections of the machine may be entirely removed and replaced by a supporting foot to be described.

Yet another object is to provide new and novel means whereby the frame may be raised out of contact with the track upon a pair of trucks, thereby rendering the device readily portable.

Yet other objects are to provide detachable operating connections between the two trucks and between the two sets of rail clamps, and to provide novel means whereby the drills may be properly fed into the material being drilled.

With the above and numerous minor objects in view, the invention resides in certain novel features of construction, and combination herein described and claimed and shown in the drawings wherein:—

Figure 2:
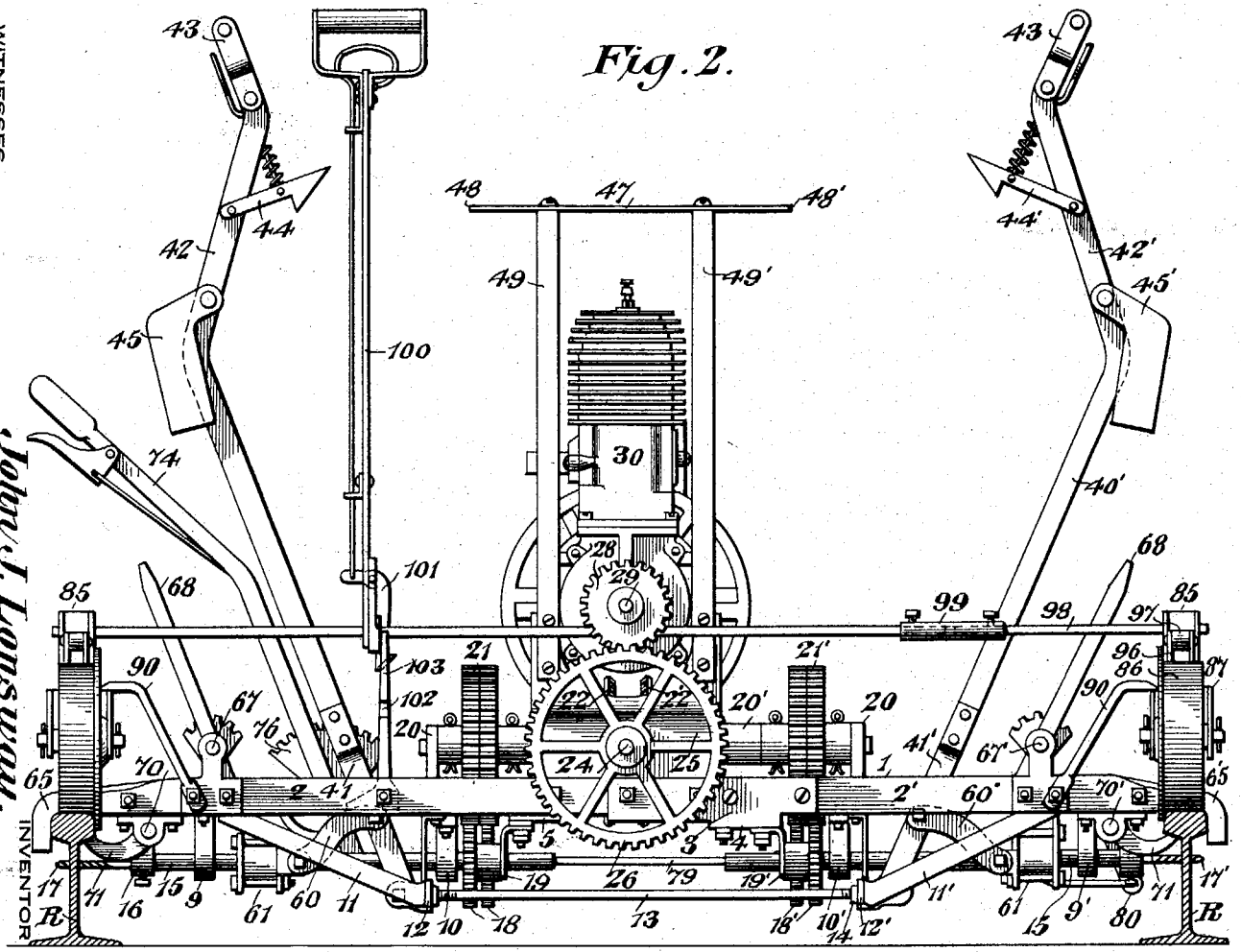
Figure 3:
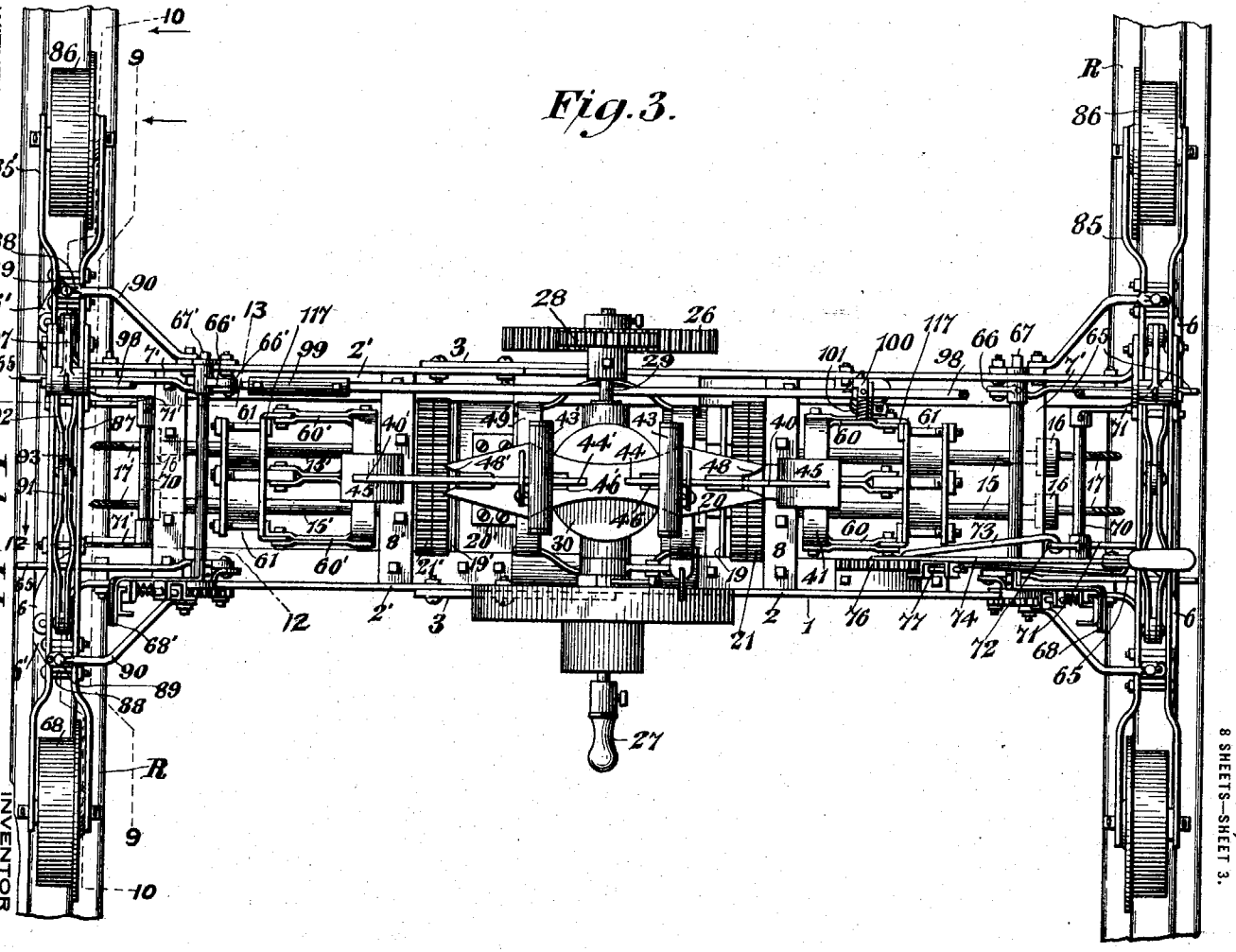
Figures 4, 29:
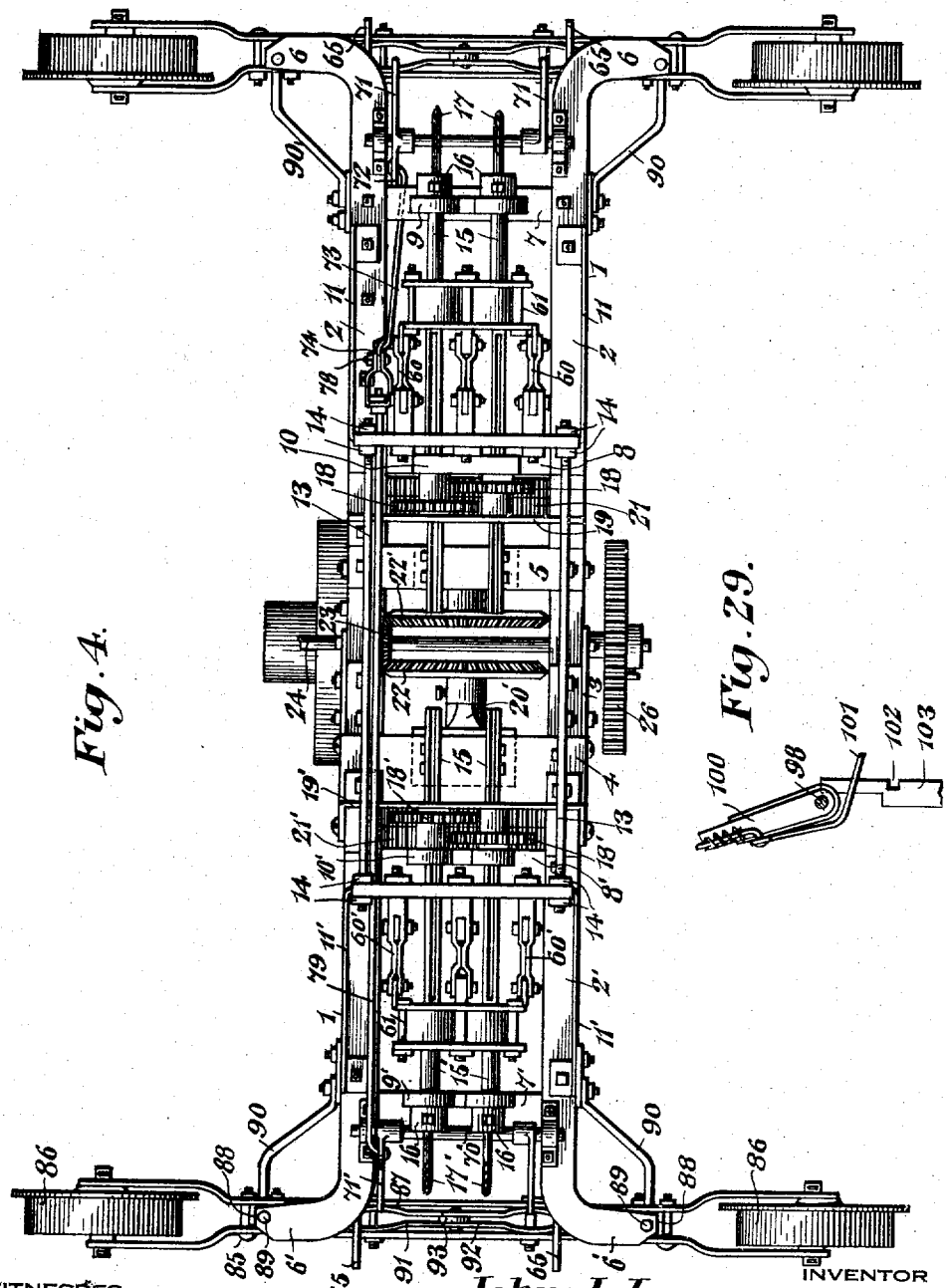
Figure 8:
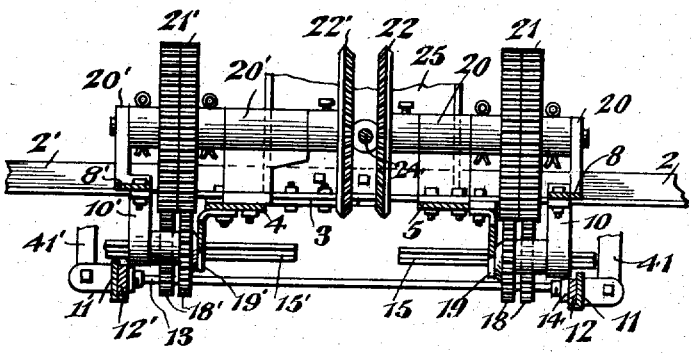
Figure 14:
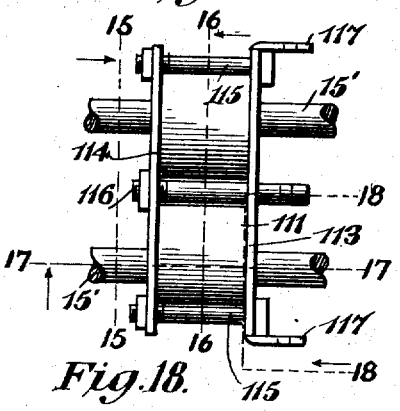
Figure 15:
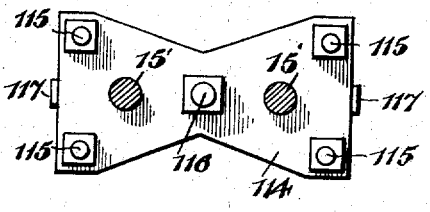
Figure 16:
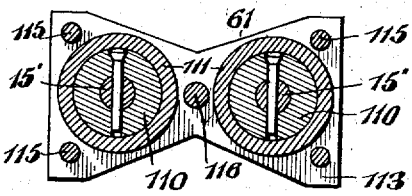
Figure 18:
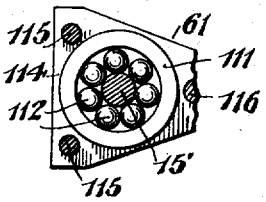
Figure 17:
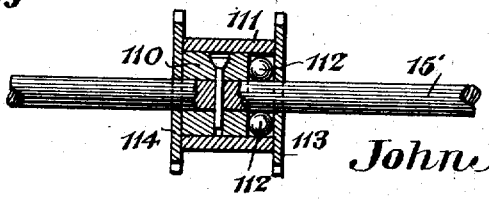
Figure 9:
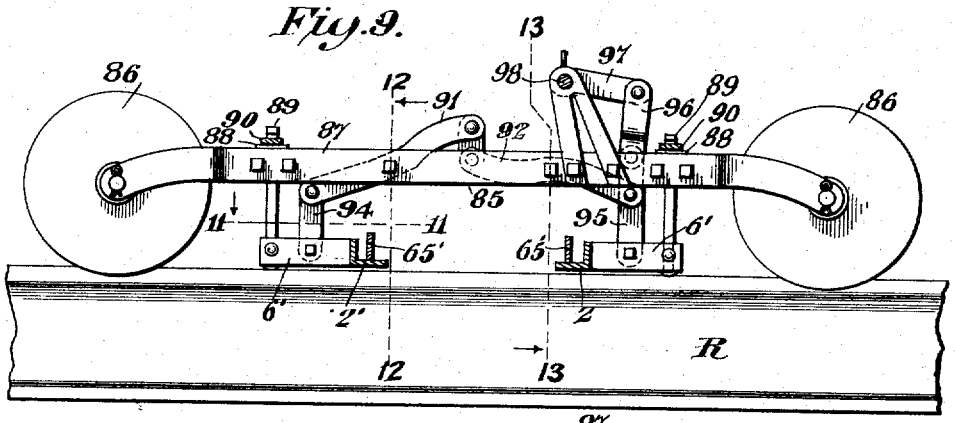
Figure 10:
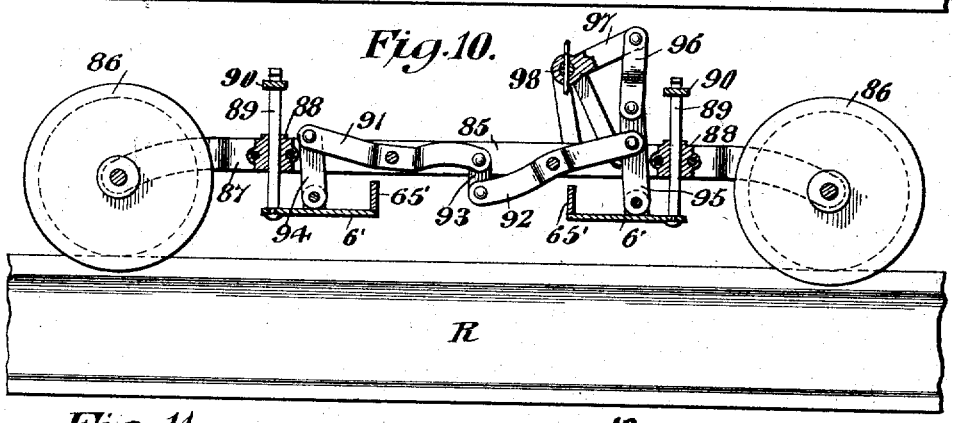
Figure 11:
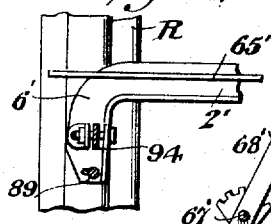
Figure 12:
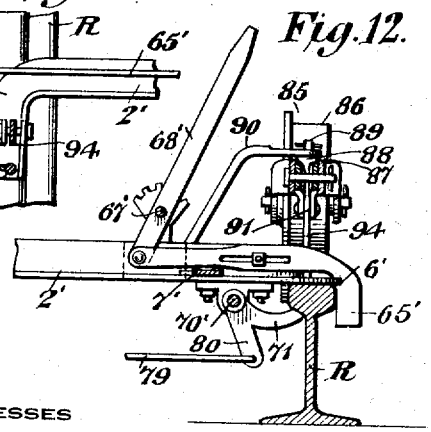
Figure 13:
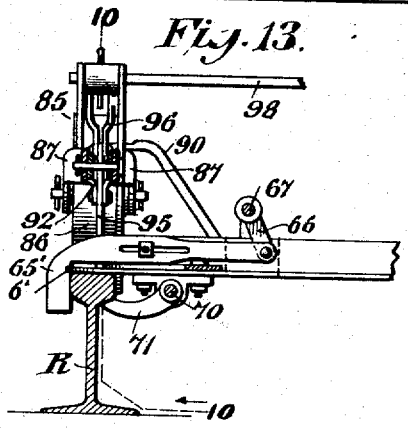
Figure 25:
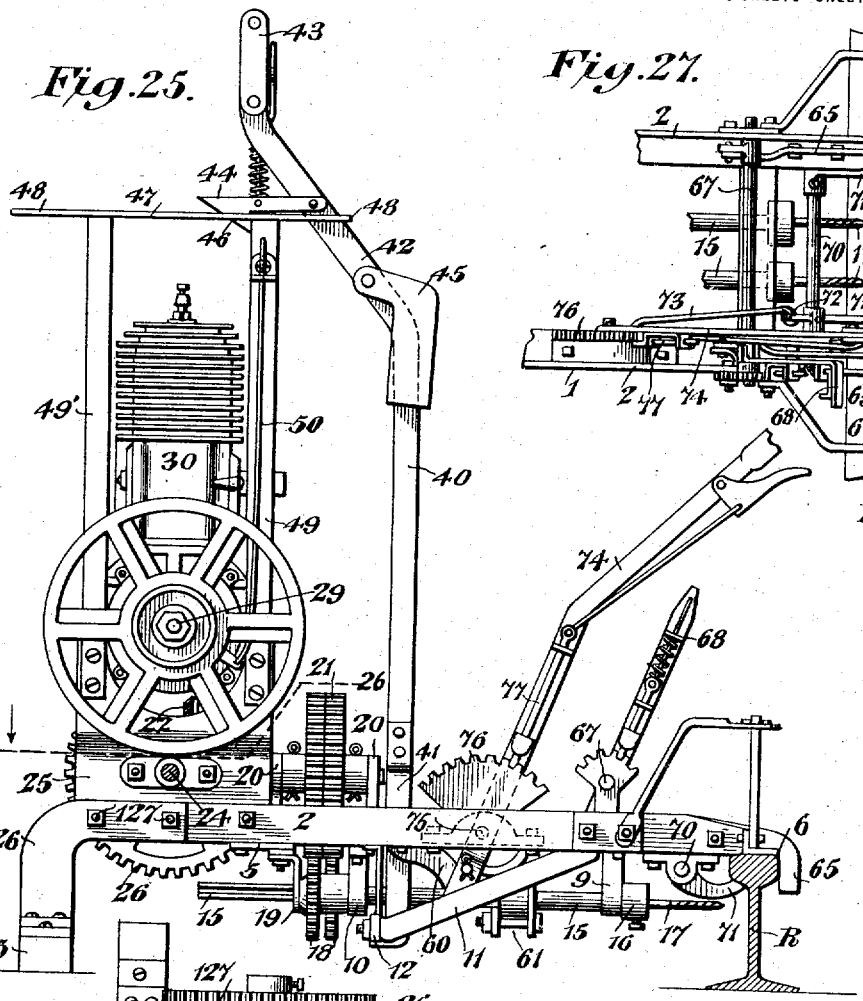
Figure 27:
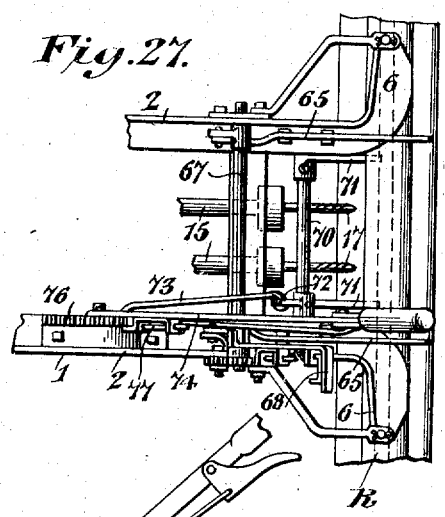
Figure 26:
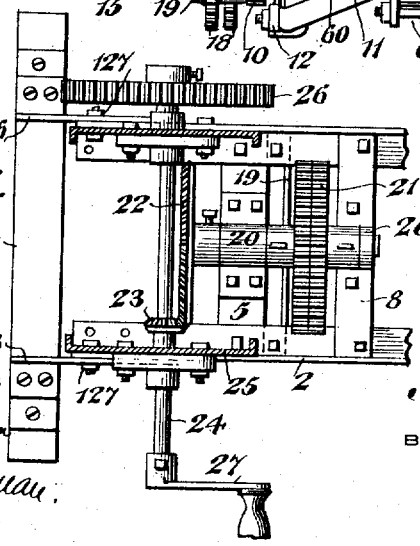
Figure 28:
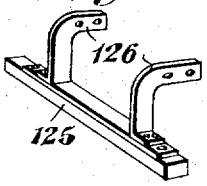

Figures 1 and 2 are side elevations of the machine taken from opposite sides thereof; Fig. 3 is a top plan view; Fig. 4 is a bottom plan view; Fig. 5 is a vertical transverse section as seen on the line 5—5 of Fig. 1; Fig. 6 is a detail horizontal section taken on the line 6—6 of Fig. 5; Fig. 7 is a vertical transverse section as seen on the line 7—7 of Fig. 6; Fig. 8 is a detail vertical longitudinal section taken on the line 8—8 of Fig. 6; Figs. 9 and 10 are vertical transverse sections taken substantially upon the lines 9—9, 10—10 of Fig. 3; Fig. 11 is a detail horizontal section as seen on the line 11—11 of Fig. 9; Figs. 12 and 13 are detail vertical sections taken on the lines 12—12 and 13—13 of Figs. 9 and 3; Fig. 14 is an enlarged plan view of one of the thrust bearings employed; Figs. 15, 16, 17 and 18 are detail vertical sections as seen on the line 15—15, 16—16, 17—17 and 18—18 of Fig. 14; Fig. 19 is a detail transverse section taken on the line 19—19 of Fig. 20 and showing an end view of one of the chucks; Fig. 20 is a plan view, partly in section, of one of the chucks; Figs. 21 and 22 are vertical sections as seen on lines 21—21 and 22—22 of Fig. 20; Fig. 23 is a detail longitudinal section taken on the line 23—23 of Fig. 19; Fig. 24 is a detail perspective view of one of the clamping plates employed in the chucks; Fig. 25 is a side elevation showing one end of the machine removed and the supporting foot applied; Fig. 26 is a horizontal section taken substantially on the line 26—26 of Fig. 25; Fig. 27 is a top plan view of one end of the machine as seen in Fig. 25; Fig. 28 is a perspective view of the supporting foot; and, Fig. 29 is a detail vertical section as seen on the line 29—29 of Fig. 1.

In the accompanying illustration the numeral 1 designates broadly a main supporting frame which includes a pair of parallel side bars, each bar being formed in two sections 2 and 2′ which are connected at their meeting ends by plates 3 which are bolted to the outer sides thereof, said plates being connected by a transverse plate 4 which is joined to the lower edges of the plates 3 and which underlies the inner ends of the sections 2′, a similar plate 5 being bolted to the lower side of the sections 2. The sections 2 and 2′ are here shown as formed of angle iron bars having their extreme outer ends bent laterally outward as seen at 6 and 6′, whereby to provide supporting shoes designed to rest upon a pair of rails R when the device is in operation.

In addition to the above named elements, the frame 1 includes transverse bars 7 and 7′ which are located near its opposite ends and other transverse bars 8 and 8′, the former supporting bearings 9 and 9′ which depend therefrom, while the latter support other bearings 10 and 10′.

For the purpose of trussing the frame 1 to the necessary extent, acute angular brackets 11 and 11′ depend from the two sections of the frame and are preferably secured to the side bars thereof, said brackets supporting transverse bars 12 and 12′ to which the opposite ends of longitudinal truss rods 13 are removably secured, preferably by means of nuts 14 as shown. Mounted to slide in the alined bearings 9 and 10 is a pair of horizontal shafts 15 which carry chucks 16 on their outer ends, said chucks, in turn carrying drills 17. The inner ends of the shafts slide freely yet non-rotatably through the hubs of pinions 18 which, as clearly seen in Fig. 4, are disposed in overlapping engagement and are held against longitudinal shifting by the bearings 10 and by transverse yoke members 19 which are secured beneath the plates 5 and provided with openings through which said shafts may slide. The opposite end of the machine is constructed in practically the same manner as the end just described, a pair of parallel longitudinal shafts 15′ being slidably mounted in the alined bearings 9′ and 10′ and carrying chucks 16′ which, in turn, carry drills 17′, the inner ends of said shafts 15′ being passed slidably yet non-rotatably through the hubs of pinions 18′ which are held against longitudinal movement by the bearings 10′ and by yoke members 19′ secured beneath the plate 4.

Rising respectively from the plates 4 and 5 and from other appropriate parts of the machine, are bearings 20 and 20′, said bearings revolubly supporting driving gears 21 and 21′ from which shafts extend inwardly toward each other, said shafts carrying beveled gears 22 and 22′ on their adjacent ends. These beveled gears mesh with a beveled pinion 23 which is rigidly keyed upon a transverse shaft 24, the latter being revolubly mounted in a pair of motor supporting plates 25 which rise from the inner ends of the sections 2. One end of the shaft 24 carries a spur gear 26 while the other end thereof may be provided with a suitable crank 27, said gear 26 meshing with a pinion 28 which is carried rigidly by the crank shaft 29 of a suitable gasolene motor 30 which is mounted upon the plates 25. By this construction, it will be seen that rotation of the crank 27 will impart movement to the crank shaft of the motor 30, which shaft is then driven by a piston within the cylinder of the motor, power then being transferred from said crank shaft 28 to the gears 21 and 21′ and to the pinions 18 and 18′, which in turn, impart rotary movement to the shafts 15 and 15′, thereby driving the drills 17 and 17′.

For the purpose of feeding the shafts 15 and 15′, the necessary extent to hold the drills into proper contact with the rails R, a pair of upright levers 40 and 40′ is provided, said levers having their lower ends formed in such a manner as to provide three-tined forks 41 and 41′, the lower ends of said forks being pivoted, by any suitable means, to the transverse bars 12 and 12′. The upper ends of the levers 40 and 40′ are bent laterally inward as seen at 42 and 42′ and are provided with operating handles 43 and 43′, with hook-shaped pawls 44 and 44′ and with operating weights 45 and 45′.

The noses of the hook-shaped pawls 44 and 44′ normally engage shoulders formed by providing slots 46 and 46′ in a horizontal plate 47 which is spaced above the motor and which is provided with notches 48 and 48′ in its opposite ends, said notches normally receiving the levers 40 and 40′. As seen in the various figures of the drawings, more particularly in Fig. 25, the plate 47 is supported upon a pair of arched standards 49 and 49′ which rise from the side plates 25, the standard 49 preferably carrying a rod 50 by means of which the timer of the motor may be controlled.

Pivoted to the forked lower ends of the levers 40 and 40′ are links 60 and 60′, the other ends of said links being pivoted to thrust bearings 61 which are constructed in a manner to be hereinafter set forth. By this means, when the pawls 44 and 44′ are raised from the position seen in Figs. 1, to that seen in Fig. 2, the levers 40 and 40′ may be swung outwardly to the position seen in Fig. 2 in which position the links 60 and 60′ will, through the instrumentality of the thrust bearings 61, force the shafts 15 and 15′ outwardly to the proper extent to impart the necessary pressure upon the drills 17 and 17′. It will be understood that the weights 45 and 45′ are designed for the purpose of increasing the amount of pressure applied to said drills.

For the purpose of clamping the machine rigidly upon the rails R, when the same is in operation, I preferably provide two sets of clamps. (See more particularly Figs. 1, 4 and 12). One set of the clamps comprises two pairs of slotted L-shaped bars 65 and 65′ which are slidably supported by passing suitable bolts through their slots and through the adjacent portions of the sections 2 and 2′. The inner ends of the bars 65 and 65′ are pivoted to arms 66 and 66′ which depend from transverse rock shafts 67 and 67′, said shafts being rocked to move the bars inwardly or outwardly, by hand levers 68 and 68′ which are provided with suitable pawl and rack mechanisms for retaining them in adjusted position. The second set of clamps comprises a pair of transverse shafts 70 and 70′ which are revolubly mounted respectively beneath the opposite ends of the bars 2 and 2′, said shafts carrying rail gripping fingers 71 and 71′ which are designed to grip the under sides of the heads of the rails R as seen in Fig. 1. The shaft 70 is here shown as provided with an operating arm 72 to the upper end of which a link 73 is pivoted, the other end of said link being pivoted to the lower end of an angular hand lever 74 which is pivoted at 75 to a rack 76 which rises from one of the sections 2, said lever being provided with a suitable pawl 77 whereby it may be locked against movement. Removably connected at 78 with the extreme lower end of the lever 74, at a point beneath the connection of the link 73 is a longitudinal operating rod 79 whose other end is pivoted to the lower end of an operating arm 80 which depends from the shaft 70′. It will, therefore, be seen that actuation of the lever 74 will simultaneously apply both sets of fingers 71 and 71′.

In connection with the mechanism, above described, I prefer to employ means whereby the entire frame and the parts carried thereby may be raised out of contact with the rails R for the purpose of transporting the machine from place to place. For this purpose, a pair of trucks designated broadly by the numerals 85 and 85′, is provided. Since the construction of each truck is identical, but one will be described.

As most clearly seen in Figs. 9 and 10, the truck 85′ is illustrated, said truck comprising a pair of flanged supporting wheels 86 whose axes are spaced and positioned in parallel planes, said axes being connected by a pair of parallel bars 87 having their opposite ends bulged outwardly for the reception of the wheels. Secured, by means of bolts or other suitable means between the bars 87, is a pair of upright bearings 88 which receive upright rods 89 rising from the laterally turned ends of the main frame 1, said rods being here shown as provided with suitable braces 90 which are connected to their upper ends and to the frame 1. Mounted between the side bars 87 and between the bearings 88, are two levers 91 and 92, the inner end of the former overlying the inner end of the latter and being connected thereto by a link 93. The opposite end of the lever 91 is connected by a link 94 with one of the adjacent ends 6′ while the outer end of the lever 92 is pivoted to an upright link 95 whose lower end is connected to the other adjacent end or foot 6′, said last named link rising above the lever 92 and being pivoted, at its upper end, to the lower end of a link 96, whose upper end is pivoted to a crank arm 97 carried by a longitudinal operating shaft 98 which is formed in two sections connected by a sleeve 99 which is provided with suitable set screws.

By reference to the drawings, it will be seen that the structure just described, is duplicated on both ends of the frame and that a crank arm 97 is carried by each end of the shaft 98. It will further be seen that said shaft 98 is provided with an operating lever 100 to which an L-shaped catch 101 is pivoted, said catch having a nose which is designed to engage a notch 102 in an upright standard 103 which rises from one of the sections 2. The nose of said catch 101 only engages said notch when the lever 101 is operated to raise the entire frame and parts carried thereby, upon the two trucks, it being understood that partial rotation of the shaft 98 will accomplish this result, through the instrumentality of the arms 97, links 94, 95 and 96, and levers 91 and 92.

Although any appropriate form could be employed, the chucks 16 and 16′ are preferably constructed as seen from Figs. 19 to 24 inclusive, the chuck 16 being here shown. This chuck 16 includes a head 105 which is provided with a slot 106 which opens through one of its sides and through one of its ends, said slot being preferably enlarged at its central portion for the reception of a clamping plate 107 which slides therein and which may be forced inwardly against the shank of the drill by a set screw 108 which is threaded through a ring or sleeve 109, the latter encircling the head 105 as clearly illustrated. As above stated, other forms of chucks may well be employed but this form is preferable since it possesses numerous advantages over certain other devices on the market. Each thrust bearing 61 includes a pair of annular shoulders 110 which are keyed, by any suitable means, to the adjacent parallel drill operating shafts, said shoulders being surrounded by sleeves 111 which are of greater length than said shoulders, thereby providing an annular space within which a series of ball bearings 112 may be placed, said bearings being retained in position by a transverse plate 113 having openings through which the shafts pass, while a second plate 114 and a pair of bolts 115, are provided for the purpose of securing the plate 113 in position. By reference more particularly to Fig. 14, it will be seen that the bolts 115 pass through the opposite ends of the plates 113 and 114, said ends projecting beyond the sleeves 111, while another bolt 116, herein shown in the form of an eye bolt, passes through the central portions of said plates between the two sleeves. It is to this eye bolt 116 and to a pair of ears 117 formed integrally with the opposite ends of the plate 113, that the links 60 and 60′ are pivoted, this construction and arrangement of parts producing an extremely advantageous device, since the thrust, exerted by the levers 40 and 40′ is evenly distributed upon the thrust bearings.

From the foregoing description taken in connection with the accompanying drawings, it will be seen that a comparatively simple machine has been provided for carrying out the objects of the invention, yet one which possesses a number of advantages.

Still another advantage of the machine, as above described and as illustrated in the drawings, is now to be set forth. It is a well known fact that a device, constructed as above described could not well be employed for drilling frogs or other peculiar formations along the track since it becomes necessary to retract the drills to an extent which would not be allowed by such construction. For this purpose, the entire left end of the machine, when viewed as seen in Fig. 1, is removed by disconnecting the plates 3 from the sections 2, by removing certain of the nuts 14 upon the truss rods 13, by loosening the set screws of the sleeves 99 and by disconnecting the operating rod 79 from the lower end of the lever 74. If desired, the detachable braces 90 may be likewise removed thereby allowing the truck 85 to be disconnected from the remainder of the device, in which case, it will be understood that one end of the section or shaft 98 and the lever 100 will be removed with said truck.

Altering the device, as above described, does not affect the operation of the drills 17, or that of the clamps 65 and 71, in any manner since the lever 74 is mounted upon the end of the machine which is now employed, and the shafts 15 are driven regardless of the fact that the shafts 15′ are removed, it being understood that the lever 68 is employed for operating the clamps 65.

For the purpose of supporting the inner end of the frame when the left end of the machine is detached, as seen in Fig. 25, a foot 125 is employed, said foot being herein shown in the form of a transverse bar designed to rest upon the cross ties, and a pair of inverted L-shaped attaching brackets 126 which rise from said bar and whose horizontal arms are provided with bolt holes to receive the bolts 127 which previously secured the plates 3 in active position. It will be noted that the motor, or power plant, is mounted upon the right hand end of the machine, this being advantageous since the same may now be employed for the purpose of driving the drills 17.

The capability of the machine for having its effective length cross-wise of the track shortened in order to drill one of the rails when the clearance between the rails is lessened by the presence of a frog or otherwise, is improved by having the motor or prime mover 30 located about midway of the cross-rail length of the machine, thereby not only balancing the machine, but leaving plenty of room for the drill operating mechanisms and the clamps whether the frame completely spans the space between the rails or is shortened to operate on but one rail.

From the last few paragraphs of description, taken in connection with the preceding explanation, it is thought that the device will be clearly understood and that its numerous advantages will be readily understood by those skilled in the art to which the invention relates.

I claim:—

1. A drilling machine for the rails of tracks, having a drilling mechanism for each rail, said machine being of a length to bridge the space between and rest upon the rails of the track and reducible in length to accommodate the machine to portions of the track where the clearance between the rails is less than the normal gage of the track.

2. A rail drilling machine of a length to span the space between and rest upon a pair of rails to be drilled and provided with drilling mechanisms for operating upon both of the rails, said machine having means at the ends for securing it to the respective rails and also reducible in length cross-wise of the pair of rails where the clearance between the rails is less than the normal spacing apart of the rails.

3. A track drilling machine provided with drilling mechanisms for operating upon respective ones of both rails of the track, means on the machine for driving the drilling mechanisms, and means for the reduction of the effective length of the machine cross-wise of the track to less than the length necessary to reach both rails of the track as normally spaced, the driving mechanism and one drilling mechanism being coactively related to be operative for drilling a rail when the length of the machine is reduced.

4. A track drilling machine provided with drilling mechanisms for operating upon respective ones of both rails of the track, a prime mover on the machine for driving both drilling mechanisms, and means for the reduction of the effective length of the machine to less than the length necessary to reach both rails of the track as normally spaced, the driving mechanism and one drilling mechanism being coactively related to be operative for drilling a rail when the length of the machine is reduced.

5. A rail drilling machine of a length to span the space between and rest upon a pair of rails to be drilled and provided with drilling mechanisms for operating upon both of the rails, means on the machine located substantially midway of the length of the machine for driving the drilling mechanisms, and means for the reduction of the effective length of the machine to less than that necessary to reach both rails of the track as normally spaced.

6. A rail drilling machine of a length to span the space between and rest upon a pair of rails to be drilled, drilling mechanisms on the machine for operating upon both of the rails, and a prime mover located substantially midway of the length of the machine and provided with means for operating both drilling mechanisms, said machine having means for the reduction of the effective length of the machine cross-wise of the rails.

7. A rail drilling machine of a length to span the space between and engage a pair of rails to be drilled, drilling mechanisms in line with each other and arranged adjacent to opposite ends of the machine and in position to be adjacent to respective tracks, and a prime mover mounted upon the machine between and in line with the drilling mechanisms.

8. A rail drilling machine of a length to span the space between and engage a pair of rails to be drilled, drilling mechanisms in line with each other and arranged adjacent to opposite ends of the machine and in position to be adjacent to respective rails, and a prime mover mounted upon the machine between and in line with the drilling mechanisms, said machine being reducible in length cross-wise of the pair of rails to accommodate it to portions of the rails where the clearance is less than the normal spacing apart of the rails.

9. A rail drilling machine of a length to span the space between and engage a pair of rails to be drilled, drilling mechanisms in line with each other and arranged adjacent to opposite ends of the machine and in position to be adjacent to respective rails, and a prime mover mounted upon the machine between and in line with the drilling mechanisms, said machine being reducible in length cross-wise of the pair of rails to accommodate it to portions of the rails where the clearance is less than the normal spacing apart of the rails, and said machine having the driving mechanism and one drilling mechanism coactively related to be operative for drilling a rail when the effective length of the machine is reduced.

10. In a rail drilling machine, a main supporting frame having opposite side bars with outturned ends to provide supporting shoes to rest upon the rails when the machine is in operation, trucks for supporting the machine, and lifting mechanism for the frame coactively related to the outturned ends and to the trucks to elevate the outturned ends from the rails when it is desired to transport the machine from place to place.

11. A rail drilling machine comprising a frame formed in two separable sections disposed end to end and designed to rest upon a pair of rails at its ends, and independent rail drilling mechanisms on the two sections of said frame.

12. A rail drilling machine comprising a frame formed in two separable sections disposed end to end and designed to rest upon a pair of rails at its ends, independent rail drilling mechanisms carried by the two sections and independent rail clamps likewise carried by said sections.

13. A rail drilling machine comprising a frame formed in two detachably connected sections and designed to be supported upon a pair of rails, independent rail drilling mechanisms carried by said sections, and driving means for said mechanisms on one section.

14. A rail drilling machine comprising a frame formed in two detachably connected sections, and designed to be positioned upon a pair of rails, independent rail drilling mechanisms on said sections, independent rail clamps likewise carried by said sections, operating means for one of said clamps on one section, and a detachable connection between said operating means and the other clamp.

15. A rail drilling machine comprising a frame formed in two detachably connected sections and designed to be supported upon a pair of rails, independent rail drilling mechanisms on said sections, transverse shafts mounted on the outer ends of said sections, rail clamping fingers carried by said shafts, a lever mounted on one section and designed for rocking the shaft on said section, and a detachable connection between said lever and the other shaft.

16. A rail drilling machine comprising a frame formed in two detachably connected sections and designed to rest upon a pair of rails, independent rail drilling mechanisms on the two sections, independent rail clamps on the two sections, operating means on one of said sections for operating the clamp thereon, a detachable connection between the operating means and the other clamp, and independent raising and lowering mechanisms on the two sections and including rollers to run on a pair of rails.

17. A rail drilling mechanism comprising a frame formed in two detachably connected sections and designed to rest upon a pair of rails, independent rail drilling mechanisms on the two sections, independent rail clamps on said sections, operating means on one of the sections for operating the clamp thereon, a detachable connection between the operating means and the other clamp, independent raising and lowering mechanisms on the two sections and including rollers to run on a pair of rails, and a detachable operating connection between said independent raising and lowering mechanisms.

18. A rail drilling machine formed in two detachably connected sections and designed to be supported upon a pair of rails, independent rail drilling mechanisms on the two sections, independent rail clamps likewise carried by the two sections, operating means on one of said sections for operating the clamp thereon, a detachable connection between the operating means and the other clamp, independent raising and lowering mechanisms on the two sections and including rollers to run on a pair of rails, and a shaft for operating said raising and lowering mechanisms, said shafts being formed in a number of detachably connected sections.

19. A rail drilling machine comprising a frame, a pair of driven shafts slidably mounted thereon, drills carried by said shafts, thrust bearings on said shafts and including a pair of shoulders rotatable therewith, a pair of transverse plates on the opposite sides of said shoulders and having openings through which the shafts project, and means connecting the two plates, a shifting lever pivoted to the frame and a link connecting one plate and said lever.

20. A rail drilling machine comprising a frame, a pair of driven shafts slidably mounted thereon, drills carried by the shafts, thrust bearings on said shafts and including a pair of shoulders rotatable therewith, a pair of transverse plates on opposite sides of said shoulders and having openings through which the shafts project, bolts passing through said transverse plates, sleeves encircling said shoulder and having their opposite ends bearing against said plates, a lever pivoted to the frame, and a link connected to said lever and to one of said plates.

21. A rail drilling machine comprising a frame, a pair of driven shafts slidably mounted thereon, drills carried by said shafts, thrust bearings likewise carried by the shafts and including shoulders rotatable therewith, sleeves encircling said shoulders, transverse plates contacting with the opposite ends of said sleeves and having openings through which the shafts project, an eye bolt passing through said plates, an upright lever pivoted to the frame, and a link pivoted to said lever and to said eye bolt.

22. A rail drilling machine comprising a frame, a driven drill slidably mounted thereon, an upright lever for sliding said drill, a plate supported above the frame and having a notch normally receiving the lever, a shoulder on said plate, and a hook shaped pawl pivoted to the lever and normally contacting with said shoulder.

23. A rail drilling machine comprising a frame, having one end to rest upon a rail, means for supporting the other end of said frame, rail drilling means on the frame, a transverse shaft likewise mounted on said frame, rail gripping fingers on said rock shaft and designed to engage the under side of a rail head, and a lever for rocking said rock shaft.

24. A rail drilling machine comprising a pair of trucks designed to run upon a pair of rails, upright bearings carried by said trucks, upright rods slidable in said bearings, a frame connected to said upright rods, rail drilling means on said frame, and means whereby said frame may be raised and lowered in respect to the trucks.

25. A rail drilling machine comprising a pair of trucks designed to run upon a pair of rails, upright bearings carried by said trucks, upright guide rods slidable in said bearings, a frame connected to said upright rods, rail drilling means on said frame, and raising levers on said trucks and connected to the frame.

26. A rail drilling machine comprising a pair of transversely spaced trucks, each truck being designed to run upon a rail, upright bearings carried by said trucks, upright guide rods slidable in said bearings, a frame connected to said upright rods, rail drilling means on said frame, raising levers on the trucks and connected to the frame, and means for operating said levers simultaneously.

27. A rail drilling machine comprising a pair of trucks each including a pair of wheels having their axes disposed in parallel planes, bars connecting the wheels of each truck, a pair of levers pivoted to each bar and having their inner ends spaced vertically, links connected to said spaced ends, other links depending from the outer ends of said levers, a frame suspended by said last named links, rail drilling means on said frame, and means whereby said levers may be rocked.

28. A rail drilling machine comprising a pair of trucks each including a pair of wheels having their axes disposed in parallel planes, bars connecting the wheels of each truck, a pair of levers pivoted to each bar and having their inner ends spaced vertically, links connecting said spaced ends, other links depending from the outer ends of said levers, a frame suspended by said last-named links, rail drilling means on said frame, a pair of bearings carried by the bars, a transverse shaft journaled in said bearings, cranks on the ends of said shaft, links connecting said cranks with certain of said levers, and a lever for rocking said shaft.

In testimony whereof I have hereunto set my hand in presence of the subscribing witnesses.

JOHN J. LONSWAY.

Witnesses:

CHARLES A. GUERNSEY,
W. O. DIVER,
SCOTT MCCONNELL.

Copies of this patent may be obtained for five cents each, by addressing the "Commissioner of Patents, Washington, D. C."